July 7, 1925.

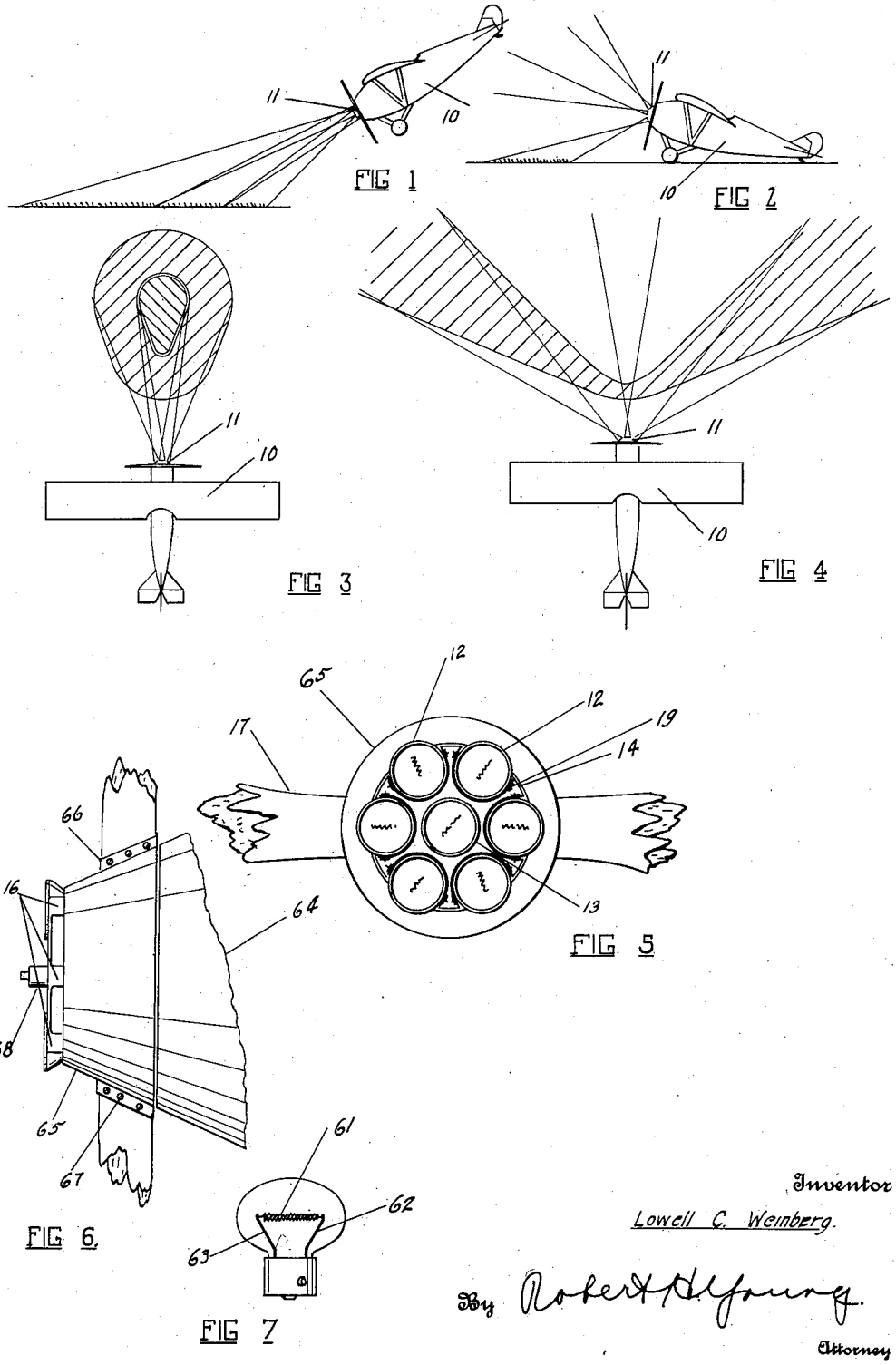

L. C. WEINBERG 1,544,962

ILLUMINATING DEVICE FOR AIRCRAFT

Filed July 23, 1921    2 Sheets-Sheet 2

Inventor

Lowell C. Weinberg.

By Robert H Young

Attorney

Patented July 7, 1925.

1,544,962

UNITED STATES PATENT OFFICE.

LOWELL C. WEINBERG, OF DAYTON, OHIO.

ILLUMINATING DEVICE FOR AIRCRAFT.

Application filed July 23, 1921. Serial No. 487,168.

*To all whom it may concern:*

Be it known that I, LOWELL C. WEINBERG, a citizen of the United States, residing at Dayton, in the county of Montgomery and State of Ohio, have invented certain new and useful Improvements in Illuminating Devices for Aircraft, of which the following is a specification.

This invention relates to an illuminating device adapted to be used on aircraft.

The lighting arrangement is preferably connected to the propeller blades of the aircraft in such manner as to rotate with the propeller. My illuminating device is particularly useful in finding a suitable landing field when flying at night; in taxi-ing, as it affords a very broad field of light; in taking off, as it illuminates obstacles both in the front and below in order that the proper clearances may be provided; while in flight, as it will illuminate the ground over which the aircraft is passing as well as any object immediately in front of the line of flight; and in night combat, as it may be used to spot enemy aircraft and also serve as a sight in directing the fire of the guns.

My invention also aims to provide an illuminating device which will not add any resistance to the traveling of the craft through the air and which will enable the pilot to have a very strong concentrated light for the purpose of picking out a landing field or in spotting enemy aircraft. The rays of light may be focused at any desired point ahead of the aircraft and, due to the revolutions of the propeller, a broad field of light will be provided. The field of light is also under the control of the pilot so that the light rays may also be diverged and thus illuminate a wider area.

The above noted objects and advantages of my invention will become more apparent on reference to the subjoined specification which describes the invention, in connection with the accompanying drawings.

In the drawings:

Figure 1 is a diagrammatic elevation of an airplane shown in a position preparatory to landing.

Figure 2 is a diagrammatic elevation of the lighting effect when the airplane is taxi-ing.

Figure 3 is a plan view of the lighted area illustrated in Figure 1.

Figure 4 is a view of the lighted area while taxi-ing, as shown in Figure 2.

Figure 5 is a front elevation of the lighting arrangement.

Figure 6 is a fragmentary side elevation showing the arrangement of the engine cowling and the extension thereof.

Figure 7 is an elevation of one of the preferred form of lighting devices or lamps.

Figure 8:
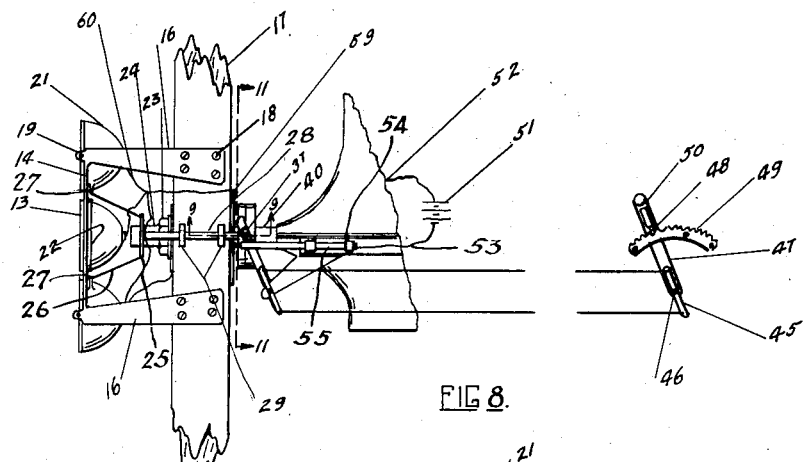
Figure 8 is a side elevation of the device with parts broken away to show the connection with a control lever for shifting the angular position of the lamps.

The numeral 10 designates an airplane having my lighting arrangement, designated as a whole at 11, mounted in the front thereof and secured to the propeller blades so as to rotate therewith. Referring more particularly to Figures 5 and 8, it will be noted that the outer lamps 12 and inner lamp 13 are mounted in recesses formed in a metallic plate or frame 14. This frame 14 is provided with a plurality of rearwardly extending arms 16 which are secured to the propeller blades 17 by suitable fastening devices 18. The lamps 12 are mounted in suitable arcuate recesses formed in the plate 14 and the plate has lugs 19 upstanding therefrom at opposite sides of these arcuate recesses and these lugs are provided with apertures for receiving journal pins 20 which project from opposite sides of the lamp housings 21. The central lamp 13 is fixed with relation to the frame 14 by means of an inwardly projecting, internally threaded flange 22 which forms a socket for receiving the housing of the lamp 13, said housing having suitable threads cut thereon for engaging the threads of the flange.

The removal of the central light 13 permits ready access to the nut 23 which abuts against the forward hub plate of the propeller. The nut 23 is of special form being provided with a cylindrical, forwardly projecting sleeve 24. A collar 25, slidably mounted on sleeve 24, has pivotally connected thereto rods 26 which are pivotally secured at their forward ends to fingers 27 formed integrally with the lamp housings 21. Rods 28 are secured to the collar 25 at one end and extend rearwardly through suitable apertured brackets 29 which are mounted upon the propeller. The rear ends of the rods 28 are threaded into a disc 31 which is mounted by means of thrust bearings 32 in annular plates 33 and 34 which are secured together by means of bolts 35. The plate 33 is provided with oppositely projecting studs 36 which are engaged in elongated slots 37 formed in operating rods 38. The plates 33 and 34 and the disc 31 are provided with axial openings 39 whereby the disc 31 is rotatably mounted on the engine shaft 40 and the plates 33 and 34 are slidably mounted thereon, these plates being maintained from rotation by means of the operating rods 38. The latter are pivotally mounted at their lower ends upon an operating shaft 41 which is rotatably mounted in brackets 42 secured to the engine bearers 43. Shaft 41 projects beyond one of the brackets 42 and has secured thereto near its outer end a lever 44, the upper and lower ends of which are connected to a lever 45 secured on a shaft 46. The shaft 46 is adapted to be rotated by means of a control lever 47 having a spring pressed pin 48 mounted thereon for engaging a ratchet sector 49. The handle 50 of the control lever is positioned within convenient reach of the pilot of the aircraft. It will be noted that the normal position of the lever 47 is closer to the front of the sector than to the rear. This is the position of the lever when the lights are in direct forward position. When it is desired to diverge the rays of light of the outer set of lamps, handle 50 is moved to the front, while when it is desired to converge the rays of light, the handle is moved rearward from its neutral position.

In order to supply electric current to the lamps, a battery 51 is carried by the aircraft, one terminal of which is grounded on the engine as at 52. The other terminal is connected by means of a wire 53 to a brush 54. This brush is carried in a stationary, cylindrical casing 55, having a screw threaded plug 56 at one end and the brush 54 at the other end. The brush is provided with a flanged head 57 and a spring 58 is compressed between the plug 56 and the flanged head 57 for the purpose of yieldingly holding the brush 54 in contact with a distributing ring 59 which is carried by the propeller so as to rotate therewith. Suitable conductors 60 lead from the ring 59 to the various lamps 12 and 13, respectively.

In view of the fact that the filaments of the bulbs of the lamps 12 and 13 will be subjected to centrifugal force, owing to their rotation with the propeller, I prefer to construct the bulbs with a filament 61 in the form of a spring connecting the terminal wires 62 and 63. By this construction, the separation of the conductors 62 and 63, due to centrifugal force, will only result in the expansion of filament 61 and will have no detrimental effect thereon.

Figures 9, 10:
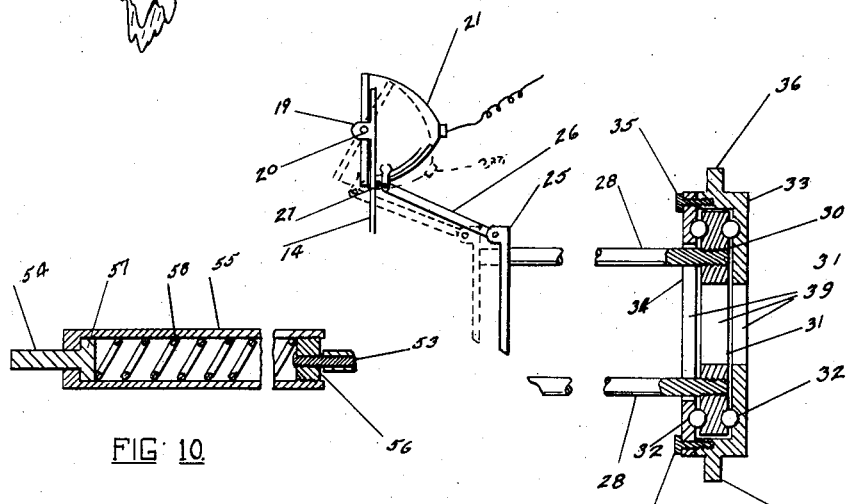
Figure 9 is a sectional view on the line 9—9 of Figure 8, showing also in elevation the connection between an operating rod and one of the lamps.
Figure 10 is a sectional view showing the spring pressed brush for distributing the electric current to the lights.
Figure 11:
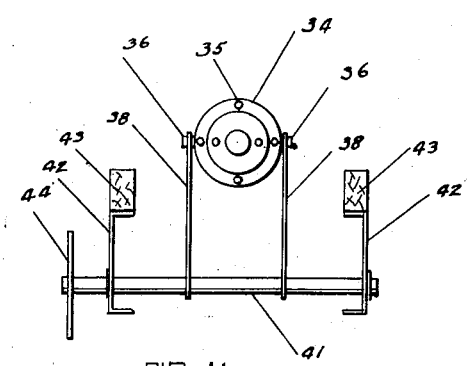
Figure 11 is a sectional view on the line 11—11 of Figure 8 looking in the direction of the arrows.

In operation the lamps may be directed straight ahead, as shown in Figure 1, when landing. In this case a considerable area of the ground is brilliantly lighted so that the pilot may pick out a suitable landing field. While taxi-ing with the lights directed in their normal forward position, a considerable area is lighted, as shown in Figure 2. This area is sufficient to illuminate any obstacles on the ground and thereby give the aviator due notice of approaching danger. In case it is desired to light a wider area the control handle 50 may be moved forward in order to displace the lights, as shown in dotted lines in Figure 9. With the lamps turned at this outer angle a larger cone of light will be produced owing to the divergence of the lamps and the rotation of the propeller. If it is desired to concentrate the light upon some particular object, the outer lights may be moved inwardly by shifting the control handle 50 to rearward position.

In order to reduce head resistance, the engine cowling 64 is provided with an extension 65 in the form of a separate conical hood which is secured to the propeller blades by means of suitable flanges 66 and fastening devices 67. With the addition of the cowling extension 65 it will be seen that the lighting arrangement of my invention does not increase the head resistance of the airplane while in flight to any considerable extent.

My invention is also particularly useful, and I consider this an important function of the invention, in providing a means for locating an enemy airplane and aiming a machine gun, or the like, upon said enemy craft. For this purpose, the pilot, when searching for the enemy craft, will use the lights with the rays focused at a considerable distance in front of the ship. When the enemy aircraft has been located, the pilot will diverge the rays of light of the outer circle of lamps until the light rays from the center light are distinct from those of the dirigible headlights. Having illuminated the enemy craft, the pilot will recognize the type thereof and thereby know the approximate size of the same. The pilot also knows that the center light will give a circle of light of a certain diameter at a given distance in front of the same, so by comparing the size of the circle of light as shown on the enemy craft with the known size of said craft, the pilot will be able to form a fair opinion of the distance to the craft. Knowing the distance, he will set the outer lights for that distance and will obtain a ring of light with a spot in the center. He will use this lighting effect in the same manner as the well known ring sights are used in daylight. That is, the center spotlight will be positioned in the line of flight of the enemy craft, with the outer ring cutting the emeny craft, at the desired point, in which case firing of the gun directed toward the center light should strike the enemy craft at the point indicated by the outer circle of light.

In Figure 6 a modified arrangement is shown in which the center light is replaced by the muzzle of a gun 68, which is adapted to fire through the center of a hollow propeller shaft. For aiming the gun mounted according to this arrangement the airplane is maneuvered so as to direct the outer circle of light to intersect the enemy aircraft at the desired point before the gun is fired. The diameter of the circle of light may be varied by changing the position of the control lever 47 and therefore the position of the control lever would depend upon the relative speed of the aircrafts in order to give the correct position of the gun when firing.

I have herein described the preferred form of my invention but it will be understood that variations and departures from the illustrated form of my invention may be made by those skilled in the art to which this invention appertains, without departing from the spirit and the scope of my invention as defined in the appended claims.

I claim:

1. In an aircraft, the combination with a propeller, of a frame secured thereto, a plurality of illuminating devices pivotally mounted in said frame, and control means for determining, in a longitudinal vertical plane the angular position of said devices relative to said frame while in flight.

2. In an aircraft, the combination with a propeller, of a frame secured thereto, an outer series of dirigible headlights carried by said frame, and a central headlight fixed to said frame.

3. In an aircraft, the combination with a propeller, of a frame secured thereto, a series of dirigible headlights carried by said frame, and mechanism for controlling in a longitudinal vertical plane the angular position of said headlights relative to the frame while in flight, said mechanism including a hand lever located within convenient reach of the pilot of said craft.

4. In an aircraft, the combination with a propeller, of a frame secured thereto, a series of dirigible headlights carried by said frame, mechanism for controlling in a longitudinal vertical plane the angular position of said headlights relative to the frame while in flight, including a hand lever located within convenient reach of the pilot of said craft, and means associated with said hand lever for indicating the angular position of said headlights.

5. In an aircraft, the combination with a propeller and a nut having a sleeve extension for retaining said propeller in position, of a frame secured to said propeller, a series of dirigible headlights carried by said frame, and mechanism for controlling the angular position of said headlights, said mechanism including a collar slidably mounted on said sleeve extension, a hand lever, rods connecting said collar and headlights, and connections between said hand lever and said collar.

6. In an aircraft, having an engine and a cowling therefor, a rotatable headlight, and a cowling extension rotatable with said headlight.

7. In an aircraft, a propeller, a plurality of rotatable headlights carried by and in front of the propeller including an outer series of dirigible lights, and means controlled in rear of the propeller for angularly adjusting said headlights while in flight.

8. In an aircraft carrying ordnance, a plurality of rotatable headlights including an outer series of dirigible lights and a fixed central light, and means for manually controlling the angular position of said dirigible lights while in flight, whereby said headlights may be used in spotting enemy craft and indicating the proper aiming of said ordnance.

In testimony whereof I have affixed my signature.

LOWELL C. WEINBERG.